United States Patent Office 3,522,291
Patented July 28, 1970

3,522,291
1,2,2,2-TETRACHLOROETHYL ESTERS
Russell M. Bimber, Painesville, Ohio, assignor to Diamond Shamrock Corporation, a corporation of Delaware
No Drawing. Filed Aug. 4, 1967, Ser. No. 658,336
Int. Cl. C07c 69/78, 69/82
U.S. Cl. 260—475                     2 Claims

ABSTRACT OF THE DISCLOSURE

Novel chemical compounds, which may be described as 1,2,2,2-tetrachloroethyl esters of terephthalic and chloro-substituted terephthalic and benzoic acids, are disclosed. The compounds, which may be prepared by reacting chloral with the appropriate acid chloride, are useful pesticides.

SUMMARY OF THE INVENTION

This invention relates to novel polychlorinated benzoates and terephthalates and, more particularly, is concerned with novel 1,2,2,2-tetrachloroethyl esters of terephthalic and chloro-substituted terephthalic and benzoic acids.

The benzene nucleus, in the case of the novel benzoates, contains at least one chlorine atom directly attached to a ring carbon atom. In the case of the novel terephthalates, one or more of the benzene ring carbon atoms may or may not be chlorine substituted.

Generally, the novel chlorinated benzoates and terephthalates of this invention may be prepared by reacting chloral with the appropriate benzoyl or terephthaloyl chloride under ambient reflux conditions without the aid of catalysts or pressures above atmospheric. At times, in order to obtain a high percentage of conversion of the acid chloride to the corresponding ester according to the above-disclosed process, it has been found beneficial to employ an acid catalyst and/or super-atmospheric pressures. These procedures are described more fully hereinafter.

The novel benzoates and terephthalates of this invention may be used as pesticides. While certain of the compounds of this invention possess fungicidal, insecticidal, bactericidal and/or viricidal properties, others are outstanding herbicides.

DETAILED DESCRIPTION OF THE INVENTION

The chlorinated benzoates and terephthalates of this invention have the structural formula:

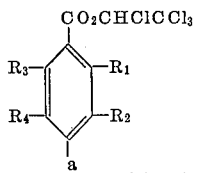

wherein $R_1$, $R_2$, $R_3$ and $R_4$ are either hydrogen or chlorine and a is either hydrogen, chlorine, or —$CO_2CHClCCl_3$, with the proviso that when a is hydrogen at least one of $R_1$, $R_2$, $R_3$ and $R_4$ is chlorine.

Typical benzoates of this invention are 1,2,2,2-tetrachloroethyl - 4'-chlorobenzoate, 1,2,2,2-tetrachloroethyl-2',3',6'-trichlorobenzoate, 1,2,2,2 - tetrachloroethyl - 2',3',5',6' - tetrachlorobenzoate, 1,2,2,2 - tetrachloroethyl-3',4' - dichlorobenzoate, 1,2,2,2 - tetrachloroethyl-2',3',4',5' - tetrachlorobenzoate, 1,2,2,2 - tetrachloroethyl-2'-chlorobenzoate and 1,2,2,2-tetrachloroethyl-3'-chlorobenzoate.

Typical terephthalates of this invention are bis(1,2,2-tetrachloroethyl)terephthalate, bis(1,2,2,2 - tetrachloroethyl)2',5' - dichloroterephthalate, and bis(1,2,2,2-tetrachloroethyl) tetrachloroterephthalate.

Generally, the novel chlorinated benzoates and terephthalates of this invention may be prepared by reacting, under ambient reflux conditions without the aid of either pressures above atmospheric or catalysts, chloral with the appropriate benzoyl or terephthaloyl chloride of the structural formula:

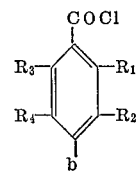

wherein $R_1$, $R_2$, $R_3$ and $R_4$ are either hydrogen or chlorine and b is either hydrogen, chlorine, or —COCl, with the proviso that when b is hydrogen at least one of $R_1$, $R_2$, $R_3$, and $R_4$ is chlorine.

Since chloral is an oily liquid with which the benzoyl and terephthaloyl chlorides are miscible at reflux temperatures, it is not necessary to employ an organic solvent or to provide an additional reaction medium. The acid chloride and chloral are admixed, introduced into suitable reflux condenser apparatus, and heated.

The reactants should be essentially anhydrous since even a small quantity of water in the reaction system may cause hydrolysis of the acid chloride or, due to the hygroscopic nature of chloral, become combined with chloral to form the hydrate. In either instance the reaction set forth above will be greatly impeded.

It is quite unexpected that this process is operable since we had previously found that the benzoyl chloride-chloral condensation would not proceed to yield the ester, at atmospheric pressure or else it decomposed when vacuum distillation was attempted.

Therefore, the teachings of the prior art that aliphatic acid chlorides may be reacted directly with chloral (see Huntress, "Organic Chlorine Compounds," 637; J. Chem. Soc., Abstracts Volume of 1887, p. 713 and Abstracts Volume of 1888, pp. 663 and 672) taken in conjunction with the disclosure stated hereinabove that benzoyl chloride cannot be condensed with chloral to yield the condensate, will not lead to this invention. Elementary organic chemistry teaches that, as a general rule, if there are no substituents present in the ortho position of the benzene ring, direct esterification of the carboxyl group proceeds in a fashion similar to the aliphatic procedure; however, because of steric hindrance, if only one of the ortho positions is occupied, esterification proceeds at a substantially decreased rate. If both such positions are occupied, the reaction may not proceed at all. In contradistinction of this, the process of this invention will not produce the unsubstituted benzoyl ester but will quite unexpectedly result in the realization of the ortho substituted benzoates and terephthalates.

The acid chloride-chloral reaction temperature will vary depending upon the specific reactants employed. Generally, the reaction proceeds readily within a temperature range of about 105° to 180° C. for the unchlorinated terephthaloyl chloride to slightly over 200° C. for the tri- and tetra-substituted acid chlorides. It is difficult to state with exactitude the temperature at which a particular conversion will proceed since there is a gradual temperature gradient as the reaction approaches completion. Similarly, reaction time also varies, depending upon the specific acid chloride employed, from about ½ hour to about 2 days.

A preferred method for preparing the novel aromatic esters is to initially react the components at a temperature sufficient to maintain a steady vertical reflux and to gradually raise the temperature to sustain the reflux during the reaction period.

In most instances, it is not necessary to employ catalysts. Although the reaction proceeds without a catalyst a small quantity of an acid catalyst will quite often decrease reaction time. The only limitation upon the choice of the acid catalysts is that it must be essentially non-aqueous for the reasons stated above. At this time, the preferred catalyst are concentrated sulfuric acid and p-toluenesulfonic acid, separately or in combination.

In most instances, as disclosed above, the novel chlorinated benzoates and terephthalates of this invention may be prepared by reacting chloral with the appropriate benzoyl or terephthaloyl chloride under ambient reflux conditions without the aid of pressure above atmospheric. However, it has been found that at times the condensation proceeds sluggishly when this procedure is employed, even with the aid of acid catalysts. When this occurs, the utilization of a closed system with its resultant increased pressure will facilitate the synthesis of the desired reaction product. The pressures employed, although obviously above those developed in a vented reflux system, are relatively low when compared to the high pressures of several hundred atmospheres routinely used in many of the chemical arts today. A pressure of up to 100 pounds per square inch, gauge is preferred. Thus, extrinsic pressure applications are usually not required. Sufficient pressure to aid the reaction is generated when the acid chloride-chloral admixture is heated to around 200° to 220° C. in a closed system.

A preferred method for preparing the novel aromatic esters using an unvented system is to insert the acid chloride-chloral admixture into a suitable sealable tube, chill, seal the tube and heat to maintain an internal temperature of about 200° C. during the reaction period.

The initial reaction product is essentially a mixture of unreacted acid chloride, unreacted chloral, and ester. Purification may be accomplished by recrystallization or, alternatively, by distillation. Preferably, when impurities are removed by the latter technique, the distillation is follower by a recrystallization step to assure the production of a pure product. If a recrystallization procedure is employed, any of a number of organic solvents such as petroleum ether, chloroform, carbon tetrachloride and the like are applicable.

The novel benzoates and terephthalates of this invention possess outstanding pesticidal properties. While certain of the species of this invention exhibit bactericidal, viricidal, insecticidal, and/or fungicidal activity, others are excellent selective herbicides.

While it is possible to apply the compounds of the present invention in undiluted form to the plant or other material to be protected, it is frequently desirable to apply the novel 1,2,2,2-tetrachloroethyl benzoates or terephthalates in admixture with either solid or liquid inert, pesticidal adjuvants. Thus, the aromatic esters can be applied to the plants for fungicidal purposes, for example, by spraying the plants with aqueous or organic solvent dispersions of the 1,2,2,2-tetrachloroethyl benzoates or terephthalates. The choice of an appropriate solvent is determined largely by the concentration of active ingredient which it is desired to employ, by the volatility required in a solvent, the cost of the solvent and the nature of the material being treated. Among the many suitable solvents which can be employed as carriers for the present pesticides, there may be mentioned hydrocarbons such as benzene, toluene, xylene, kerosene, diesel oil, fuel oil, petroleum, naphtha; ketones such as acetone, methyl ethyl ketone and cyclohexanone; chlorinated hydrocarbons, such as carbon tetrachloride, chloroform, trichloroethylene, perchlorethylene, etc.

The aromatic esters can also be applied to plants and other materials along with inert solid fungicidal adjuvants or carriers such as talc, pyrophyllite, attaclay, kieselghur, chalk, diatomaceous earth, calcium carbonate, bentonite, fuller's earth, cottonseed hulls, wheat flour, soybean flour, etc., pumic, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols fatty acid esters of polyhydric alcohols, ethylene oxide addition products of such esters; addition products of long-chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate. A typical surface active agent is Aerosol OS (sodium salt of propylated naphthalene-sulfonic acid).

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with solid carrier in finely divided form in amounts small enough to preserve the free-flowing property of the final dust compositions.

When solid compositions are employed, in order to obtain a high degree of coverage with a minimum dosage of the formulation, it is desirable that the formulation be in finely divided form. The dust containing active ingredient usually should be sufficiently fine that subsantially all will pass through a 20-mesh Tyler sieve. A dust which passes through a 200-mesh Tyler sieve also is preferable.

For dusting purposes, preferably formulations are employed in which the active ingredient is present in an amount of 5 to 50 percent of the total by weight. However, concentrations outside this range are operative and compositions containing from 1 to 99 percent of active ingredient by weight are contemplated, the remainder being carrier and/or any other additive or adjuvant material which may be desired. It is often advantageous to add small percentages of surface active agents, e.g., 0.5 to 1 percent of the total compositions by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0 percent of a surface active agent, by weight, is included in the liquid composition.

For adjuvant purposes, any desired quantity of surface active agent may be employed, such as up to 250 percent of the active ingredient by weight. If the surface active agent is used only to impart wetting qualities, for example, to the spray solution, as little as 0.05 percent, by weight, or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30 percent, by weight, of the total and may be 10 percent, or even as low as 0.01 percent.

The novel aromatic esters of the present invention can be employed in compositions containing other pesticides, more especially, fungicides, insecticides and bactericides.

Thus it is to be understood that the term "carrier" when employed in the specification and claims herein signifies broadly all fluid material and/or particulate matter with which the various species of this invention may be associated in pesticidal formulations.

In order that those skilled in the art may more completely understand the present invention and the preferred methods by which the same may be carried into effect, the following specific examples may be offered.

EXAMPLE I

Preparation of bis(1,2,2,2-tetrachloroethyl) terephthalate 20.4 grams of TPC (terephthaloyl dichloride) are intermixed with 20 ml. of chloral. The transparent mixture, containing 0.1 mole of TPC and 0.2 mole of chloral, is then introduced into a suitable tri-necked flask equipped with thermometer and water-cooled reflux condenser. Normal reflux occurs initially at around 105° C., with the temperature gradually rising to a peak at around 180° C. during the 16-hour reaction time. The resultant yellowish mixture is then chilled and crystallized from 40 ml. of petroleum ether at around 20° C. After filtration, the precipitate is elutriated with petroleum ether. Recrystallization from carbon tetrachloride yields about 12 grams (about a 24% yield) of white particulate reaction product, melting in the range of 126.5° to 129° C. Elemental and infra-red analysis confirm the preparation of the desired bis(1,2,2,2-tetrachloroethyl) terephthalate.

| Element | Percent Calculated | Percent Found I | Percent Found II |
|---|---|---|---|
| Cl | 57.0 | 56.6 | 56.7 |

EXAMPLE II

Preparation of 1,2,2,2-tetrachloroethyl-2',3',4',5'-tetrachlorobenzoate

With apparatus similar to that employed in Example I, 29.4 grams of 2,3,4,5-tetrachlorobenzoyl chloride (0.105 mole) and 11 ml. of chloral (0.11 mole), together with 6 drops of concentrated sulfuric acid, are refluxed for 23 hours over a temperature span of 119° C. initially to a high of 176° C. at time of apparatus shut-off. The solution is then placed into a separation funnel along with an equal volume of saturated aqueous sodium bicarbonate. The wax-like solid which forms almost immediately is then dissolved in chloroform and filtered through sodium sulfate to remove impurities. After recrystallization, the still somewhat impure product is again dissolved in an equal mixture of ethyl ether and petroleum ether, chilled, filtered and dried. 13.5 grams (30.2% yield) of 1,2,2,2-tetrachloroethyl-2'3'4'5'-tetrachlorobenzoate is obtained melting at 94 to 95° C. Elemental and infra-red analysis confirm the synthesis of the desired 1,2,2,2-tetrachloroethyl-2'3'4'5'-tetrachlorobenzoate.

| Element | Percent Calculated | Percent Found I | Percent Found II |
|---|---|---|---|
| C | 25.4 | 25.7 | 25.3 |
| H | .47 | 0.9 | 0.9 |
| Cl | 66.6 | 66.1 | 66.6 |

EXAMPLES III THRU X

The following compounds may be prepared according to the reaction conditions set forth in the following chart:

| Ex. | Reactants | Temp. °C. | Catalyst | Time (Hours) | Apparatus | B.P. (°C.) | M.P. (°C.) | Product | Elemental Analysis Percent Calculated C | H | Cl | Percent Found C | H | Cl | Yield, Percent |
|---|---|---|---|---|---|---|---|---|---|---|---|---|---|---|---|
| III | Chloral (20 ml. or 0.2 mole) and tetrachloroterephthaloyl dichloride (34.1 g. or 0.1 mole). | 110 to 198 | | 23 | Reflux-Condenser. | | 252.5 to 253.5 | CO₂CHClCCl₃ on tetrachlorobenzene with CO₂CHClCCl₃ | 22.7 | 0.32 | 66.9 | 22.8 | 0.56 | 68.45 | 33 |
| IV | Chloral (20 ml. or 0.2 mole) and 2,5-dichloroterephthaloyl dichloride (27.2 g. or 0.1 mole). | 160 maximum | | 20 | do | | 176 to 181 | CO₂CHClCCl₃ on dichlorobenzene with CO₂CHClCCl₃ | 25.4 | 0.71 | 62.5 | 25.5 | 0.9 | 61.1 | 18.6 |
| V | Chloral (20 ml. or 0.2 mole) and 2,3,6-trichlorobenzoyl chloride (48.8 g. or 0.2 mole). | 205 to 210 | | 24 | Sealed Tube | | | CO₂CHClCCl₃ on trichlorobenzene | 27.6 | 0.77 | 63.15 | 28.0 | 1.2 | 63.3 | 19.8 |

| Ex. | Reactants | Temp. °C. | Catalyst | Time (Hours) | Apparatus | Physical Properties B.P. (°C.) | Physical Properties M.P. (°C.) | Product | Elemental Analysis Percent Calculated C | Elemental Analysis Percent Calculated H | Elemental Analysis Percent Calculated Cl | Elemental Analysis Percent Found C | Elemental Analysis Percent Found H | Elemental Analysis Percent Found Cl | Yield, Percent |
|---|---|---|---|---|---|---|---|---|---|---|---|---|---|---|---|
| VI | Chloral (20 ml. or 0.2 mole) and o-chlorobenzoyl chloride (35 g. or 0.2 mole). | 168 maximum | Concentrated $H_2SO_4$ | ½ | Reflux Condenser. | 111 to 114 at 0.08 mm. Hg. | | $CO_2CHClCCl_3$ — C₆H₄Cl | 33.5 | 1.56 | 55.0 | 33.8 | 1.6 | 54.45 | 62.1 |
| VII | Chloral (20 ml. or 0.2 mole) and p-chlorobenzoyl chloride (35 g. or 0.2 mole). | 162 maximum | Concentrated $H_2SO_4$, p-toluene sulfonic acid. | 47 | ...do... | 122 to 123 at 0.09 mm. Hg. | | $CO_2CHClCCl_3$ — C₆H₄Cl | 33.5 | 1.56 | 55.0 | 33.7 | 1.7 | 55.25 | 31.5 |
| VIII | Chloral (20 ml. or 0.2 mole) and 2,3,5,6-tetrachlorobenzoyl chloride (55.6 g. or 0.2 mole). | 205 to 210 | | 17 | Sealed Tube. | | 109.5 to 111 | $CO_2CHClCCl_3$ — C₆HCl₄ | 25.4 | 0.47 | 66.6 | 25.9 | 0.6 | 66.25 | 28.6 |
| IX | Chloral (20 ml. or 0.2 mole) and m-chlorobenzoyl chloride (35 g. or 0.2 mole). | 160 maximum | Concentrated $H_2SO_4$ | 1½ | Reflux. | 115 at 0.1 mm. Hg. | | $CO_2CHClCCl_3$ — C₆H₄Cl | 33.5 | 1.56 | 55.0 | 33.7 | 1.7 | 55.0 | 62.1 |
| X | Chloral (20 ml. or 0.2 mole) and 3,4-dichlorobenzoyl chloride (41.9 g. or 0.2 mole). | 145 maximum | | 50 | ...do... | 123 to 126 at 0.09 mm. Hg. | 47.5 to 51 | $CO_2CHClCCl_3$ — C₆H₃Cl₂ | 30.3 | 1.13 | 59.6 | 30.4 | 1.2 | 59.65 | 15.4 |

B.P.=Boiling Point.  M.P.=Melting Point.

The following examples, while illustrating many of preferred embodiments of this invention, are intended as exemplifications only and the interpretation of the claims is not to be limited thereby.

EXAMPLE XI

Tests against four bacterial species

Test formulations of the compounds of this invention are examined for ability to inhibit the colonial growth of *Erwinia amylovora* (*E.a*), *Xanthomonas phaseoli* (*X.p.*), *Staphylococcus aureus* (*S.a.*), and *Escherechia coli* (*E.c.*) at various concentrations. The basic test formulation contains 0.1 g. of the test chemical (or 0.1 ml. if a liquid), 4.0 ml. acetone, 2.0 ml. stock emulsifier solution (0.5% Triton X-155 in water by volume) and 74.0 ml. distilled water, the concentration of toxicant in this formulation being 1250 parts per million. Lower concentrations of toxicant are obtained by diluting the basic formulation with distilled water.

Two ml. of each formulation is dispensed into a test tube which is then placed into a water bath maintained at 44° C. From a stock preparation (also held at 44° C.), 8 ml. of 20 percent nutrient agar is added to the test tube giving a 1:5 dilution or a final concentration of 250 p.p.m.

chemical in the agar. The contents of the test tube are then thoroughly mixed, while still warm, with the aid of a Vortex type mixer and immediately poured into a sterile polystyrene Petri dish (100 x 15 mm.). After the agar in the plate has set, suspensions of each organism are simultaneously streaked onto the surface of the agar. After the plate is inoculated, it is incubated 24 to 48 hours at 30° C., after which time each organism is rated visually for growth inhibition by the candidate chemical. Estimates of percent growth inhibition are relative to growth of streak colonies in control plates obtained during individual tests. Using this procedure, the following results are obtained.

| Compounds | Concentration, p.p.m. | Percent Control | | | |
|---|---|---|---|---|---|
| | | E.a. | X.p. | S.a. | E.c. |
| 1,2,2,2-tetrachloroethyl-3'4'-dichlorobenzoate | 250 | 100 | 100 | 100 | 0 |
| 1,2,2,2-tetrachloroethyl-4'-chlorobenzoate | 250 | 100 | 0 | 100 | 0 |
| 1,2,2,2-tetrachloroethyl-3'-chlorobenzoate | 250 | 100 | 100 | 100 | 0 |
| 1,2,2,2-tetrachloroethyl-2'-chlorobenzoate | | 100 | 100 | 100 | 0 |
| Bis(1,2,2,2-tetrachloroethyl-2',5'-dichloroterephthalate | 250 | 50 | 0 | 50 | 0 |
| 1,2,2,2-tetrachloroethyl-2',3',4',5'-tetrachlorobenzoate | 250 | 100 | 0 | 100 | 0 |

EXAMPLE XII

Soil drench and post-emergence foliage spray combination

To measure the foliage contact and soil drench herbicidal activity of compounds of this invention, a test formulation of 150 ml. is prepared for both the soil drench and foliage spray treatments. This formulation contains 0.24 g. of the test chemical (or 0.24 ml. if a liquid), 4.0 ml. acetone, 2.0 ml. stock emulsifier solution (0.5% Triton X–155 in water by volume), and 94.0 ml. distilled water.

The plants used for this test are planted in 3½ in. pots as follows:
(a) Tomato, var. Bonny Best, one plant per pot;
(b) Garden bean, var. Tendergreen, four plants per pot;
(c) Field corn, var. Cornell M–3, four plants per pot;
(d) Oats, var. Russell, 15 to 20 plants per pot.

The various test species are planted so that at treatment time they are at the following stages of growth:

(a) Tomato—three to five inches tall;
(b) Bean—the first trifoliate leaf begins to unfold;
(c) Corn—four to six inches tall;
(d) Oats—three to five inches tall.

In the soil drench treatment, the soil surface of each pot (tomato, bean corn, and oats) is drenched with 17.5 ml. of the test formulation, resulting in an application of 64 pounds per acre. The four pots are then sprayed simultaneously with the remaining 80 ml. of formulation on a rotating turntable in a hood at 40 p.s.i. This foliage spray contains 2400 p.p.m. of chemical. After the plant foilage dries, the plants are placed in the greenhouse. The results are recorded fourteen days after treatment. Phytotoxicity is rated on the scale from 0, indicating no plant injury, to 11, plant kill and, additionally, stunting of the plant is rated on a scale of 1—slight to 9—severe. Other responses such as formative effects, defoliant activity, growth-regulant properties, and chlorosis are recorded. Using this procedure, the following results are obtained.

| Compound | Dosage (Soil drench), lbs./acre | Dosage (Foilage Spray), p.p.m. | Phytotoxicity and Other Effects | | | |
|---|---|---|---|---|---|---|
| | | | Tomato | Bean | Corn | Oats |
| 1,2,2,2-tetrachloroethyl-2',3',6'-trichlorobenzoate | 64 | 2,400 | 6, St 9 | 11 | 2 | 3 |
| 1,2,2,2-tetrachloroethyl-2',3',5',6'-tetrachlorobenzoate | 64 | 2,400 | 4 | 0, St 9 | 1 | 0 |
| | 32 | 1,200 | | 0, St 9 | | |
| | 8 | 300 | | 0, St 9 | | |
| 1,2,2,2-tetrachloroethyl-2',3',4',5'-tetrachlorobenzoate | 64 | 2,400 | 0 | 2, St 9, Fe | 0 | 2 |
| | 32 | | | 0, St 3, Fe | | |
| | | 1,200 | | 0, St 9, Fe | | |
| | | 600 | | 0, St 9 | | |
| | | 300 | | 3, St 9 | | |

St=Stunting.
Fe=Formative effects.

EXAMPLE XIII

Systemic bactericidal test

Test formulations are examined for ability to control tomato crown gall (*Agrobacterium tumefaciens*). A test formulation containing 0.24 g. of the test chemical (or 0.24 ml. if a liquid), 4.0 ml. acetone, 2.0 ml. stock emulsifier solution (0.5% Triton X–155 in water by volume), and 94.0 ml. distilled water is prepared for both the soil drench and foliage spray treatments. Individual tomato plants, var. Rutgers, are planted in 3½-inch clay pots and are 3 to 5 inches tall at treatment time. Stem puncture inoculation, at the cotyledonary node, with a cellular suspension of the *Agrobacterium tumefaciens* is made one to two hours prior to the soil drench and foliage spray treatment.

In the soil drench treatment, the test formulation is applied at the soil surface of each pot; 17.5 ml. (2400 p.p.m.) of the formulation being equivalent to a dosage of the test chemical of 64 pounds per acre. For foliage spray application, 20 ml. (2400 p.p.m.) of the test formulation are sprayed at 40 pounds per square inch air pressure while the plants are being rotated on a turntable in a hood. Control is determined through visual observation of tumor formation 10 to 14 days after treatment.

A rating of 90% is given to an estimate of complete control. Using this procedure, the following results are obtained:

| Compound | Dosage Lbs./acre | P.p.m. | Percent Control |
|---|---|---|---|
| 1,2,2,2-tetrachloroethyl-2',3',6'-trichlorobenzoate | 64 | 2,400 | 90 |

EXAMPLE XIV

Systemic bean rust fungicide test

Pinto bean plants at a growth stage when the trifoliate leaves are just beginning to emerge from the axil of the seed leaves are used as the test species. These plants are grown in 4-inch pots and thinned to three plants per pot. Usually the plants are about 10 to 14 days old from time of planting. There are, therefore, six primary seed leaves per pot for each test unit. In the test, an appropriate amount of the test formulation is drenched on each pot. A dosage of 56 ml. of the test formulation is equivalent to 56 mg. of chemical or 64 pounds per acre. This test formulation contains the test compound, acetone, stock emulsifier solution and distilled water. The concentration of toxicant in this formulation is up to 2000 parts per million. Lower concentrations of toxicant are obtained by diluting the formulation with distilled water. About two or three hours after treatment the plants are exposed to a spore suspension of bean rust from a culture maintained in the greenhouse. It is not necessary to apply the spores to the plants, but spores are carried by air currents from the culture to the treated plants giving heavy uniform infection on the controls at the end of the holding period. After exposure, the plants are immediately placed in a moist chamber in a saturated atmosphere at 60° F., for 24 hours after which they are removed to the greenhouse. The rust sport suspension contains 40 mg. spores in 300 ml. of 0.01 percent Tween 20. Counts are made about 10 days after sport exposure and the mean number of rust pustules per leaf is determined. These counts are calculated against the check counts to arrive at the percentage disease control. Using this procedures, the following results are obtained:

| Compound | Concentration, lbs./acre | Percent Disease Control |
|---|---|---|
| 1,2,2,2-tetrachloroethyl-3′,4′-dichlorobenzoate | 32 | 100 |

EXAMPLE XI

Foliage protectant and eradicant tests

The tomato foliage disease test measures the ability of the test compound to protect tomato foliage against infection by the early blight fungus *Alternaria solani* (Ell. and Mart.). The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 sonidia of *A. solani* per ml. The atomizer used delivers 20 ml. in the 30-second exposure period. The plants are held in a saturated atmosphere for 24 hours at 70° F. (for E. Blight) to permit spore germination and infection before removal to the greenhouse. After two days from the start of the test for early blight lesion counts are made on the three uppermost fully expanded leaves. The data are converted to percent disease control based on the number of lesions obtained on the control plants. Dosages and percent disease control are given in the following table:

| Compound | Dosage Concentration, p.p.m. | Percent Disease Control |
|---|---|---|
| 1,2,2,2-tetrachloroethyl-4′-chlorobenzoate | 1,000 | 86 |

EXAMPLE XVI

Viricide test

Test formulations are examined for ability to control the host virus system maize dwarf mosaic virus on Golden Bantam sweet corn. A test formulation containing 0.1 g. of the test chemical (or 0.1 ml. if a liquid), 4.0 ml. acetone, 2.0 ml. stock emulsifier solution (0.5% Triton X–155 in water by volume), and 94.0 ml. distilled water is prepared for both the soil drench and foliage spray treatments. The host virus system maize dwarf mosaic virus on *Zea mays* var. Golden X Bantam, is in a four-inch clay pot. Virus inoculation is made by Carborundum leaf abrasiun method prior to treatment.

In the foliage spray application, 33 ml. of the test formulation (1000 p.p.m.) are sprayed at 40 pounds per square inch air pressure while the plants are being rotated on a turntable in a hood. Twenty-four hours after spraying, in the soil drench treatment, the test formulation is applied at the soil surface of each pot; 45 ml. of the formulation being equivalent to a dosage of the test chemical of 64 pounds per acre. Effective control is determined through visual observation of the presence or absence of viral infection symptoms ten days after inoculation. Using this procedure, the following results are obtained:

| Compound | Dosage Lbs./acre | P.p.m. | Percent Control |
|---|---|---|---|
| 1,2,2,2-tetrachloroethyl-2′,3′,6′-trichlorobenzoate | 64 | 1,000 | 100 |

It is to be understood that although the invention has been described with specific reference to particular embodiments thereof, it is not to be so limited, since changes and alternations therein may be made which are within the full intended scope of this invention as defined by the appended claims.

What is claimed is:

1. A composition of matter of the structural formula:

$$\begin{array}{c} CO_2CHClCCl_3 \\ | \\ R_3 \diagup\!\!\!\diagdown R_1 \\ | \quad\quad | \\ R_4 \diagdown\!\!\!\diagup R_2 \\ | \\ a \end{array}$$

wherein $R_1$, $R_2$, $R_3$ and $R_4$ are selected from the group consisting of H and Cl and $a$ is selected from the group consisting of H, Cl, and —$CO_2CHClCCl_3$, with the proviso that when $a$ is H at least one of $R_1$, $R_2$, $R_3$ and $R_4$ is Cl.

2. A composition of matter of claim 1 which is selected from the group consisting of 1,2,2,2-tetrachloroethyl-4′-chlorobenzoate, 1,2,2,2 - tetrachloroethyl - 2′,3′,6′ - trichlorobenzoate, 1,2,2,2 - tetrachloroethyl-2′,3′,5′,6′-tetrachlorobenzoate, 1,2,2,2-tetrachloroethyl - 3′,4′ - dichlorobenzoate, 1,2,2,2 - tetrachloroethyl-2′,3′,4′,5′-tetrachlorobenzoate, 1,2,2,2-tetrachloroethyl - 2′ - chlorobenzoate, 1,2,2,2-tetrachloroethyl - 3′ - chlorobenzoate, bis(1,2,2,2-tetrachloroethyl)terephthalate, bis(1,2,2,2 - tetrachloroethyl)-2′,5′-dichloroterephthalate, and bis(1,2,2,2-tetrachloroethyl)tetrachloroterephthalate.

References Cited

Delacre: J. Chem. Soc., Abstracts Volume, pp. 672–673 (1887).

Huntress: Organic Chlorine (Compounds, pp. 620 and 637 (1948).

LORRAINE A. WEINBERGER, Primary Examiner

E. J. SKELLY, Assistant Examiner

U.S. Cl. X.R.

71—107, 112; 260—476; 424—308